United States Patent [19]
Bergeron

[11] 3,991,455
[45] Nov. 16, 1976

[54] COUPLED PISTON RING METHOD OF MANUFACTURE

[76] Inventor: Alfred Bergeron, 1288 Bagley, Lot 6, Dallas, Tex. 75211

[22] Filed: Mar. 7, 1974

[21] Appl. No.: 449,043

Related U.S. Application Data

[63] Continuation-in-part of Ser. No. 242,588, April 10, 1972, abandoned, which is a continuation-in-part of Ser. No. 185,274, Sept. 30, 1971, abandoned.

[52] U.S. Cl. .................. 29/156.6; 29/156.62; 277/193; 277/197; 277/221; 72/327; 72/352; 83/51
[51] Int. Cl.² .................................. B23P 15/08
[58] Field of Search......... 29/156.6, 156.63, 156.62; 277/193, 197, 136, 137, 199, 216, 217, 221; 72/327; 83/14, 51

[56] References Cited
UNITED STATES PATENTS

| | | | |
|---|---|---|---|
| 1,344,342 | 6/1920 | Hanson | 277/222 |
| 1,348,640 | 8/1920 | Hachmann | 29/156.6 |
| 1,851,108 | 3/1932 | Morton | 277/193 |
| 1,956,513 | 4/1934 | Neault et al. | 277/193 |
| 1,987,866 | 1/1935 | Olson | 29/156.6 |
| 2,057,940 | 10/1936 | Durham | 277/193 |
| 2,111,291 | 3/1938 | Mason | 277/193 |
| 2,202,802 | 5/1940 | Mason | 277/193 |
| 2,209,925 | 7/1940 | Mason | 277/193 |
| 2,258,576 | 10/1941 | Madsen | 277/197 |
| 2,359,007 | 9/1944 | Smith | 277/193 |
| 2,670,255 | 2/1954 | Bergeron | 277/193 |
| 2,768,865 | 10/1956 | Baker | 277/221 |
| 3,455,565 | 7/1969 | Jepson | 277/197 |
| 3,563,819 | 2/1971 | Rheingold et al. | 113/119 |
| 3,724,305 | 4/1973 | Kondo | 83/14 |
| 3,792,867 | 2/1974 | Bergeron | 277/193 |
| R19,477 | 2/1935 | Dixon et al. | 72/327 |

FOREIGN PATENTS OR APPLICATIONS 674,736 11/1963 Canada ............................... 72/352

Primary Examiner—C.W. Lanham
Assistant Examiner—Dan C. Crane
Attorney, Agent, or Firm—Peter J. Murphy

[57] ABSTRACT

A ring assembly includes two side-by-side flat ring members of uniform rectangular cross-section each being split, with the confronting split ends having radially overlapping fingers to define a circumferentially sealing joint. The ring members are dimensioned to be received in a common piston groove with the ring members being non-rotatably coupled so that the joint of one member will always be rotationally spaced from the joint of the other to define an axial seal for the ring assembly. A non-rotational coupling is provided by an integral tab formed in one member and projecting transversely therefrom and received in a mating transverse recess in the other member, with the recess having a larger dimension than the tab to permit sliding movement of the ring members relative to each other within the groove. Two forms of tabs include a partially sheared and bent tab and a partially displaced shear plug.

7 Claims, 10 Drawing Figures

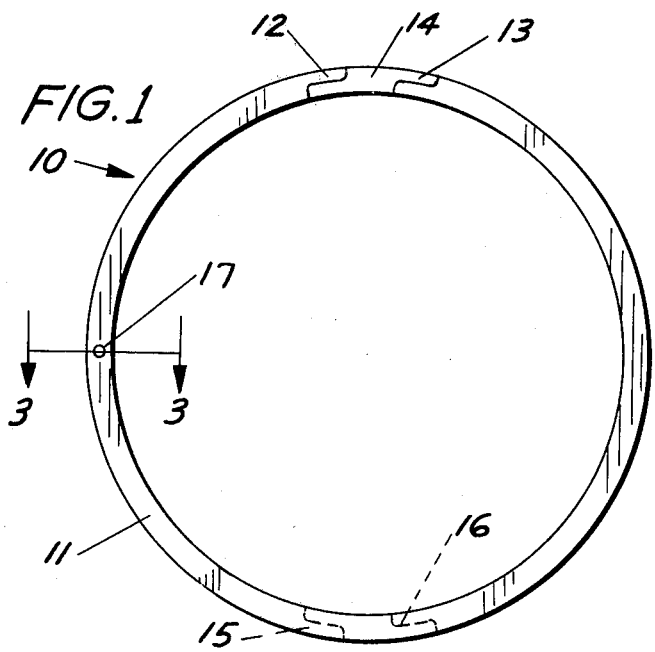
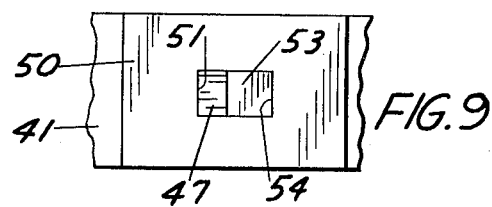
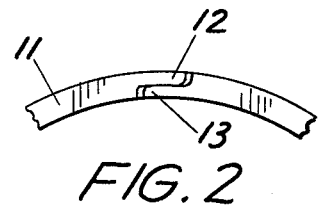
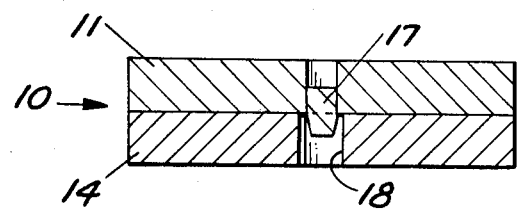
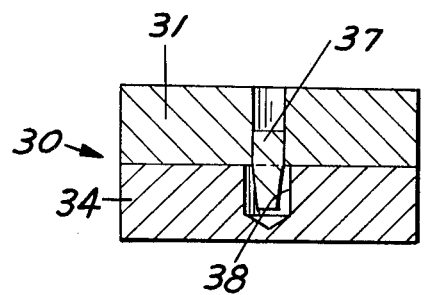
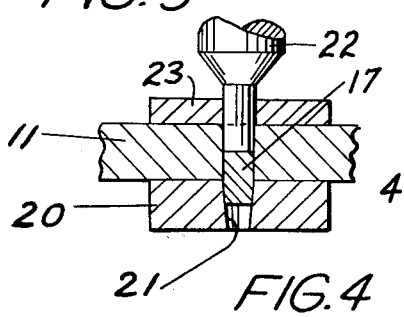
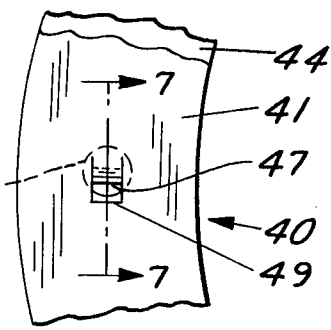
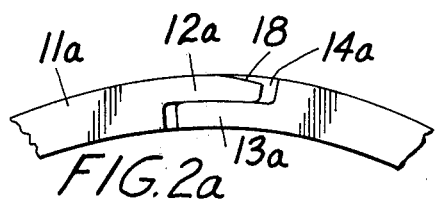
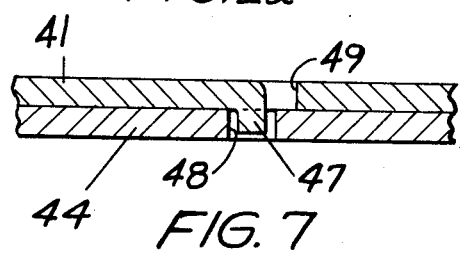
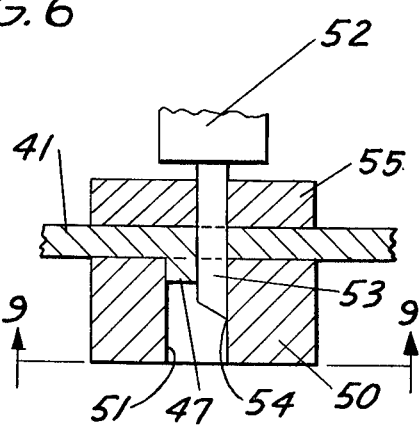

3,991,455

COUPLED PISTON RING METHOD OF MANUFACTURE

REFERENCE TO RELATED APPLICATIONS

This is a continuation-in-part of application Ser. No. 242,588 filed Apr. 10, 1972 now abandoned. Application Ser. No. 242,588 is a continuation-in-part of application Ser. No. 185,274, filed Sept. 30, 1971 now abandoned.

BACKGROUND AND SUMMARY OF THE INVENTION

This invention relates to an improved, fully sealed piston ring structure particularly adapted for use in high pressure engines and pumps, and to a method for fabricating such ring structure.

This invention further relates to an improvement of piston rings of the type described in my prior U.S. Pat. No. 2,670,255 issued Feb. 23, 1954.

In internal combustion gasoline engines for a typical present day passenger car, the engine pistons are provided with two compression rings and one oil ring. The compression rings are conventionally unitary rings which are split and have adjacent abutting ends. In the assembly of these rings onto the piston and into an engine, some clearance must be provided between the adjacent ends to allow for therman expansion. Necessarily then there is a gap between the adjacent ends of each ring which presents a direct path for gases from one side of the ring to the other. An oil ring defines an expansion gap in the same manner. The result of this is that, even though the three rings are in series, there is a direct path for gases to flow between the cylinder compression chamber and the base of the piston, which is of course open to the crank case. This direct path results in losses in the engine efficiency and increases the pollution of the air due to exhaust emissions and crank case ventilation for the following reasons.

In regard to reduction of engine efficiency the degree of compression of the air, or air-fuel mixture, on the compression stroke is less than it should be for the reason that, during the compression stroke, some of the compressed gases flow past the piston rings into the crank case. Similarly, on the power stroke of the piston some of the expanding gases are blown past the piston into the crank case thereby not producing useful work on the head of the piston. It has been estimated by automotive people that, even with the best available piston rings of the type above mentioned, there is a minimum 10 to 15 percent loss of compression.

This path between the cylinder chamber and crank case increases contamination or pollution of the air for the following reasons. First, with the above mentioned loss of efficiency additional fuel is necessarily consumed to compensate for the loss of efficiency resulting in additional exhaust emissions. Secondly, on the suction stroke of the piston where the cylinder chamber pressure is less than that in the crank case, oil and vapors from the crank case will be drawn into the cylinder chamber to be subsequently compressed on the compression stroke with the fuel oil mixture and burned on the power stroke. This of course contaminates the fuel air mixture and produces unburned hydrocarbonns which are then discharged through the exhaust system. Furthermore the flow of gases into the crank case during the compression and power strokes results in contamination and vapors in the crank case which are subsequently drawn back into the cylinder chamber from the crank case on the suction stroke.

To obviate these problems, fully sealed compression rings are desirable. Possibly why one reason such fully sealed rings have not been made available in conventionanl automobile engines is that the expense of manufacture is considerably greater than that for the above mentioned conventional unitary compression rings. Therefore what this invention contemplates is the production of fully sealed, precision manufactured rings which may be used in conventional passenger engines but which may be manufactured readily and rapidly at a reasonable cost.

An object of this invention is to provide an improved piston ring assembly, and method of manufacture, which substantially eliminates both radial and axial blowby.

Another object of this invention is to provide an improved, fully sealed piston ring assembly providing extremely close contact with a cylinder wall.

A further object of this invention is to provide a piston ring assembly, and method of manufacture, for use in a single piston groove which is far superior to a single piston ring, yet which may be manufactured expeditiously and economically.

A still further object of this invention is to provide a fully sealed piston ring assembly capable of economic yet precision manufacture, and a method of manufacture therefor.

Still another object of this invention is to provide a fully sealed piston ring assembly capable of economic yet precision manufacture, and method of manufacture therefore, consisting of side-by-side rings with a tab and recess antirotation coupling, wherein the tab is an integral part of the respective ring member.

These objects are accomplished in a ring assembly manufactured according to the following steps: forming first and second split compression ring members with parallel side surfaces and generally cylindrical peripheral edge surfaces, dimensioned for side-by-side mating relation; forming circumferentially overlapping radially contiguous tongues in the ends of each ring member, with radially confronting sealing surfaces; forming an index tab integral with said first ring member by deforming a portion of the ring material, intermediate its ends and intermediate its edges, to produce a boss projecting laterally from one side thereof and having a sharp intersection with said side surface; forming a recess in one side of said second ring member, intermediate its ends and intermediate its edges, dimensioned to receive said boss with lateral clearance, to permit limited relative sliding movement of said first and second ring members in side-by-side relation; positioning said boss and said recess, on said respective first and second ring members, to maintain the joints of the mated ring members in rotationally spaced relation to each other; and finishing the confronting sides of said ring members to be fully contiguous in assembled mated relation.

The novel features and the advantages of the invention, as well as additional objects thereof, will be understood more fully from the following description when read in connection with the accompanying drawings.

DRAWINGS

FIG. 1 is a view of a compression ring structure according to the invention, with the ring joints being expanded as they would be in a free state outside of a cylinder;

FIG. 2 is a fragmentary view of the ring structure of FIG. 1 in compressed form showing the radially sealed joint with slight clearance for thermal expansion;

FIG. 2a is a fragmentary view of an alternative form of ring configuration at the ring joint;

FIG. 3 is a sectional view of the ring structure of FIG. 1 taken in the plane 3—3 of FIG. 1 showing one form of projecting tab;

FIG. 4 is a diagrammatic view illustrating the formation of the tab of FIG. 3;

FIG. 5 is a sectional view similar to the view of FIG. 3, showing an alternative form of ring structure;

FIG. 6 is a fragmentary view from one side or face of a similar ring structure illustrating an alternative form of projecting tab;

FIG. 7 is a sectional view taken in the plane 7—7 of FIG. 6;

FIGS. 8 and 9 are diagrammatic views illustrating the formation of the ring tab of FIGS. 6 and 7.

DESCRIPTION OF THE PREFERRED EMBODIMENTS

In the drawings, there are illustrations of several forms of compression ring assemblies according to the invention, including means for preventing relative rotation of the ring members while permitting relative lateral or sliding movement to provide for the most efficient operation of the ring structure. These ring assemblies are particularly adapted for use in conventional passenger automobiles and are characterized as "fully sealed" rings which means that a ring assembly, as assembled into a single piston ring groove, is sealed in both axial and radial directions. Any direct flow path across the ring in a direction parallel to the axis of the piston is eliminated by the assembly of at least two rings assembled in side-by-side relation with means for rotationally locking the two rings to assure that the joints of the two rings will never be axially aligned. The ring assembly is radially sealed for the reason that the ring joints include circumferentially overlapping tongues or fingers providing mating cylindrical sealing surfaces preventing flow across the ring member in a radial direction. In assembled relation, the ring members, which are fully lapped, are placed side-by-side and are separated only by a film of lubricant to obviate any radial path between the members. The rings are dimensioned of course to be closely confined within the common piston groove. The following description will refer to the illustrated two-ring assemblies.

The rotational coupling is designed to permit relative lateral or sliding movement of the two ring members, so the rings may slide relative to each other and also relative to the piston groove for the purpose of seating and sealing independently on the cylinder walls. Since the ring assembly consists of two independent rings, having a combined thickness no greater than a single conventional standard ring, the two independent rings are more flexible and will follow the cylinder walls more closely particularly in situations where the cylinder walls assume an out-of-round condition.

Fully sealed rings of this type will provide significantly improved operation, as compared with conventional unitary piston rings for passenger automobiles, in that blowby past the piston rings is eliminated thereby obviating loss of compression and reduced engine efficiency. For the reasons already discussed this improved ring structure also produces a significant reduction in exhaust emissions which contaminate and pollute the atmosphere.

Embodiment of FIGS. 1 through 5

FIGS. 1, 2 and 3 illustrate one preferred form of the invention which consists of a ring assembly 10 consisting of upper and lower split rings 11 and 14 each having a rectangular cross-section as best seen in FIG. 3. As seen in the drawings, the upper and lower rings are assembled in side-by-side contiguous relation with the joints of the two rings rotationally spaced from each other. In FIG. 1 the assembled ring members are shown in a free condition wherein the joints are separated; and FIG. 2 illustrates the compressed condition of the ring assembly of FIG. 1 showing the condition of the joint for the upper ring 11 when assembled to a piston and compressed within a cylinder. In this condition the joint provides a radial seal.

Referring now to the ring joints, the ends of the upper ring 11 are provided with radially interengaging, circumferential or overlapping tongues or fingers 12 and 13; with the tongue 12 defining an extension of the radially outer peripheral portion of the ring member, and the tongue 13 defining an extension of the radially inner portion of the ring member. The tongues are dimensioned so that, in the compressed relation, the confronting edges, which preferably are defined by cylindrical surfaces generated about the center axis of the ring, are contiguous and define sealing surfaces preventing radial blowby across the ring joint. Since these sealing surfaces are cylindrical the seal will be maintained at all times and thermal expansion of the ring will not affect the seal.

Similarly the ends of the lower ring member 14 are provided with radially interengaging tongue extensions 15 and 16, which provide a radial seal for the ring member in the same manner.

As an example of the physical dimensions of this ring assembly, the assembly of FIG. 3 may be dimensioned to be received in a piston ring groove having a width of 0.078 inches for example which is a rather typical groove width for the engines of passenger automobiles and which normally accommodates a unitary ring dimensioned to be closely received within such groove. Each of the rings 11 and 14 of FIG. 3 then may have a thickness of 0.0385 inches for example as compared with a radial width or depth of approximately 3/16 or 0.1875 inches.

Further with regard to the preventing of radial blowby, the confronting sides or faces of the rings 11 and 14 must fit together perfectly, and for this purpose the faces of the rings are fully lapped during manufacture so that when assembled together there is no gap between the ring members. There will of course be some lubricant between the mating faces of the rings, and this lubricant along with the finish of the surface assures that there is no radial path or blowby between the ring members.

FIG. 2a illustrates a modified form of ring configuration which may be desirable where the assembly is used in ported cylinders, such as the cylinders of two-cycle engines. In this configuration the ring tips at the joints are vulnerable to breakage should the tips be rotationally aligned with the cylinder ports. To obviate this, the tip of the outer finger 12a as seen in FIG. 2a may be ground off as indicated at 18 so that this finger tip is spaced from the cylinder wall in assembled relation.

This grinding off will not represent an axial blowby path, since the assembly is still fully sealed by the adjacent coupled ring 14a. With this arrangement the extremity of the finger 12a does not engage the edges of the cylinder port, and is therefore less subject to deformation and breakage.

Another aspect of the fully sealed ring assembly is the prevention of axial blowby and this is accomplished by the fact that the joint for the upper ring 11 is rotationally displaced from the joint for the lower ring 14. In FIG. 1, these joints are shown as being spaced apart about 180°; however this feature of preventing axial blowby will be effective so long as there is some substantial displacement of the ring member joints. The path of any leakage then would necessarily be through the top joint, then between the confronting surfaces of the two rings to the point of the joint of the lower member. Again, because the confronting surfaces are fully lapped the possibility for this type of leakage path is very small, even though the rotational spacing of the two joints is not great. A rotational overlap of only 10° or 15° for example would be effective in this regard.

To effect this seal against axial blowby, it is necessary to assure that the joints cannot rotate to an axially aligned position; and it is for this purpose that an anti-rotatioin coupling is provided for this ring structure. The anti-rotation coupling illustrated in FIG. 3 is one preferred form which includes a tab 17 projecting downwardly from the lower face of the upper ring 11 and being received in a mating recess 18 in the lower ring. In this case the projecting tab is in the form of a shear plug, which is formed in a manner to be described, having a generally circular cross-section and which is received in a hole 18 also being circular in cross-section. The hole 18 is larger in diameter than the tab 17 so that the tab is received within the mating hole with a clearance permitting relative movement of the two ring members in all directions. The difference in diameter may be in the order of 0.005 inches for example. It is desirable to have a loose or clearance fit, so that the individual ring members 11 and 14 will seat independently of each other within the cylinder walls and therefore follow the cylinder walls independently in the event that they should become slightly out of round. However it is also desirable that the hole 18 be made as small as possible to minimize any weakening of the ring member 14.

The shear plug 17 is essentially an integral part of the upper ring member 11, in the sense that it is punched and partially sheared or displaced from the ring member in the manner shown in FIG. 4; and this method for forming the tab is particularly suited for ring members fabricated from cast iron.

FIG. 4 is a diagrammatic illustration of a punching operation wherein the upper ring member 11 is placed over a precision made die plate 20 having an opening 21, wherein a hold down plate 23 maintains the ring member in engagement with the die plate, and wherein a punch member 22 is moved with force against the upper surface of the ring member in alignment with the die opening 21. For this operation the die plate and hold down plate may be part of a light hydraulically or mechanically actuated punch press carrying a reciprocating ram on which the punch is mounted. The punching tip of the punch is cylindrical and moves through a hole in the hold down plate having a diameter corresponding to the punch tip diameter. The upper or proximal end of the die plate opening 21 is of a selected diameter which corresponds generally with the diameter of the punch tip; and, as shown in greatly exaggerated form in FIG. 4, the die opening 21 may preferably be slightly tapered reducing in diameter toward its distal end.

FIG. 4 illustrates the completion of the punching operation, wherein the punch tip 22 extends into the ring member about one-half the thickness of the member, so that the tab 17 is formed from a plug which has a length generally corresponding to the thickness of the ring member, and which has been partially sheared from the ring member with half of its length remaining within the ring member and the remaining half projecting from the under side of the ring member. The tapered hole 21 of the die plate 20 presents an external resistance to the displacement of the shear tab resulting in some axial compression and lateral expansion of the shear tab material to assist in binding it to the walls of the shear bore.

The result of this operation is the formation of the projecting tab 17 formed essentially integrally from the material of the upper ring member 11.

The tab therefore is rigidly connected to the ring member 11, and is not likely to be displaced from the ring member even though there may be substantial lateral forces acting on the tab which is most unlikely. The projecting tab is formed with substantially cylindrical (very slightly tapered) walls forming a sharp intersection with the adjacent surface of the ring member, so that there is no fillet formed at this joint which would tend to effect separation of the confronting ring members due to relative rotational movement of example when they are assembled.

In the FIG. 3 configuration, the hole 18 extends completely through the lower ring member 14 in view of the relatively small thickness of the ring member.

FIG. 5 of the drawing illustrates a slightly modified form of ring structure consisting of upper and lower ring members 31 and 34 which have a substantially greater thickness. In this case a shear tab 37 is formed in the manner just described, and the mating recess 38 is formed by a bore, preferably drilled, which extends from one face of the lower ring member 34 to a depth just sufficient to accommodate the projecting tab 37. In this case then the lower exposed face of the lower ring member 34 is not disturbed.

While the method for fabricating the above described ring assembly may be fairly apparent from the foregoing description, the following is a summary of the steps involved in the method for fabricating such assembly. The ring members 11 and 14 for the initial phases of manufacture are identical, and may be fabricated from cast iron using conventional techniques to form the basic ring members having the described parallel side walls and generally cylindrical periphery. A departure from the conventional technique is that of forming the radially interengaging fingers 12 and 13 illustrated in FIG. 2, with the initial steps being principally concerned with forming two confronting cylindrical surfaces for the fingers 12 and 13 which will ultimately provide the seal against radial blowby.

For the recess ring member having the hole recess 18 of FIG. 3 or the recess 38 of FIG. 5, such recesses may be formed before finishing operations such as lapping and external grinding. The hole 18 may be formed either by drilling or punching for example. The recess 38 will preferably be formed by drilling. Finishing operations, which preferably include lapping of the parallel side surfaces and grinding of the cylindrical edge surfaces, would preferably follow the drilling or punching operations. For the tab-ring members 11 or 31, the lapping and grinding operations would preferably be performed prior to the forming of the respective tabs 17 or 37. This would be preferable for the grinding operation in order to permit the finish grinding of a multiplicity of rings in a single operation. The formation of the shear tab 17 or 37 then would be the final operation.

The tap 17 is formed by supporting one ring face on a die plate having a die opening of selected cross-section, by urging a punch against the opposite face of the ring member while clamping the ring member against the die plate with a hold down member, and limiting movement of punch into the ring member to approximately one half the thickness of the member whereby a partially sheared and displaced plug projects from the ring member into the die plate opening. A further step involves restraining the movement of the shear plug out of the ring member to effect expansion of the plug material, to effect firm retention of the shear plug within the ring member.

A feature of this structure and method is that the tab 17 is formed essentially integrally from the ring member 11 by a simple operation; and, with the use of appropriate tooling, the projecting tab 17 is formed of engagement with a mating recess without disturbing the finish of the ring member which is necessary for maintaining the ultimate fully sealed operation of the ring structure.

Embodiment of FIGS. 6 through 9

FIGS. 6 and 7 of the drawing illustrate a ring assembly including side-by-side upper and lower ring members 41 and 44 similar to those previously described but including a different form of anti-rotation coupling. As best seen in FIG. 7 the lower ring 44 includes a hole 48 extending through the ring member which defines a recess for accomodating the tab 47 projecting from the upper ring member 41. In this configuration the tab 47 is fabricated by a punching (or shearing) and forming (or bending) operation which displaces certain of the material of the ring member and bends it downwardly or transversely to form the tab 47. For this operation, the ring material must be a material such as steel which will permit such bending and forming operations.

The method of forming the tab 47 is illustrated diagrammatically in FIGS. 8 and 9 wherein there are shown components of a light punch press, for example, including a die plate 50 having a rectangular die opening 51, and a punch ram 52 having a punching tool 53 which is rectangular or square in cross-section and dimensioned to only partially fill or occupy the die opening 51. The leading edge of the punching tool 53 is inclined relative to the direction of punch movement to provide a cutting edge 54 along one side of the tool 53. The tool 53 is guided through a hold down plate 55, having an aperture corresponding in cross-section to that of the tool, and which clamps the ring member 41 against the die plate.

In the diagrammatic illustration of FIG. 8, the position of the punch 52 is shown at the end of the punching operation. As seen in this figure, the punch has moved transversely downward cutting and displacing a portion of the material of the ring member 41 and forming a punch opening 49 adjacent to the tab 47.

As best seen in FIG. 9, looking from the bottom of the die plate 50, the die opening 54 is rectangular in cross-section to accommodate the punching tool 53 with the remaining cross-section of the die opening defining the cross-sectional dimension of the tab 47. As the tool 53 moves downwardly, the material of the tab 47 is displaced from the punch opening 49 and formed in the manner best illustrated in FIG. 8. Again the tab is formed to have a sharp intersection with the adjacent ring surface.

For this operation the tab 47 is formed precisely, is integral with the ring member 41, and has a square cross-section. For this assembly, the mating hole 48 should have a diameter related to the maximum dimension of the tab 47 so that the desired clearance or lash is provided.

Again, with this method of forming the anti-rotation projecting tab 47, the finishing operations on the upper ring member 41 such edge grinding and the lapping would be performed prior to this punching and forming operation which would be the last operation; and the method of punching and forming the tab 47 will not disturb the finish of the lapped surfaces. In this manner, the tab is formed economically with a simple machining operation, providing for economical manufacture of this type construction. Again, the bore 48, or a recess if desired, would preferably be formed prior to the grinding and lapping operations on the ring member 44.

While, as illustrated in FIG. 7, the openings 49 and 48 in the respective coupled ring members 41 and 44 represent a direct axial path through the coupled rings, these openings being spaced from the outer peripheries of the rings will be within the ring groove of the piston in assembled relation, so that this path is not exposed. Possibly it would be preferably, whre the thickness of the ring member 44 permits, that the recess 48 not extend completely through the ring member to further minimize a possible axial blowby path.

Features and Advantages

What has been described are several forms of an improved piston ring assemblies, and method for manufacturing same, which assemblies are fully sealed in the sense of eliminating both axial and radial blowby. Because, in piston rings, there is necessarily a gap at the joint of the ring, there is an inherent axial blowby path. This axial path is eliminated by providing a pair of rings in side-by-side relation, with coupling means to assure that the ring gaps are never axially aligned.

A principal feature of the invention is the means for preventing relative rotation of the ring members to prevent this axial alignment of the gap, while at the same time not disturbing other features of the ring structure and assembly. While various forms of mating projections and recesses are available to provide an anti-rotation coupling, for some of these forms the manufacturing costs would be prohibitive. For other forms, the particular coupling means might tend to cause axial separation of the coupled rings, thereby creating a leakage path; or the structure may be such that the projecting member would become dislodged to cause scoring of the piston and cylinder wall. According to applicant's invention, the coupling projection or tab is made integral with one ring member by operations which minimize manufacture costs; and the opportunity for the projecting member to become dislodged is minimized. Another feature of the invention is that methods are provided for forming such a projection in piston rings made either of cast iron or other more ductile metals.

The problem of axial blowby is not eliminated by merely preventing axial alignment of the gaps of two coupled rings, since a blowby path may exist through the gap of one ring, through the base of the piston ring groove, and then through the gap of the adjacent ring. Also, the rings must be so mated that there is no space between the abutting surfaces of the coupled rings. Another feature of the invention is that radial blowby across the ring gaps is eliminated by the radially interlocking tongues. A radial path between the rings is eliminated by the fact that the ring side faces are fully lapped or otherwise finished, and will be sealed relative to each other by a film of lubrication in operation. Another feature of the invention is that the method of fabricating the coupling tabs or projections does not disturb the lapped or finished surfaces of the ring members.

Another feature and advantage of the assembly is that a conventional single piston ring in a ring groove is replaced by a pair of rings which are thinner and more flexible for better engagement with the cylinder wall, and that the rings are coupled for independent radial movement for individual sealing with the cylinder wall.

Accordingly an overall advantage of the invention is the ring structure and method of manufacture which permits manufacture of fully sealed ring assemblies at a cost which can be competitive with conventional rings, considering the vastly superior performance, and which provides the advantage of better engine performance in the sense of reducing fuel consumption in relation to power output with the obvious advantage of conserving fuel. Also there is inherently less contamination of the atmosphere because of lower fuel consumption and because of lower oil contamination of the combustion mixture.

While preferred embodiments of the invention have been illustrated and described, it will be understood by those skilled in the art that changes and modifications may be resorted to without departing from the spirit and scope of the invention.

I claim:
1. A method for fabricating a piston ring assembly including the steps
    forming first and second split compression ring members of uniform, generally rectangular cross-section, with parallel planar side surfaces, and with a cylindrical peripheral outer edge surface, dimensioned for side-by-side mating relation;
    finishing the mating side surfaces of said ring members to be fully contiguous in assembled mated relation, to effect a seal between said ring members;
    forming circumferentially overlapping, radially contiguous tongues in the ends of each ring member, with radially confronting sealing surface to provide radially sealed joints;
    forming an index tab integral with said first ring member by deforming a portion of the ring material, intermediate its ends and intermediate its edges, to produce a boss projecting generally perpendicularly from its mating side surface and having a sharp intersection with said side surface; said boss having a small transverse cross-section relative to the edge-to-edge width of said member;
    forming a recess in the mating side surface of said second ring member, intermediate its ends and intermediate its edges, dimensioned to receive and surround said boss with limited lateral clearance, to permit limited relative sliding movement of said first and second ring members in side-by-side relation; said recess having a small transverse crossjsection relative to the edge-to-edge width of said member;
    positioning said boss and said recess, on said respective first and second ring members, to maintain the joints of the mated ring members in rotationally spaced relation to each other.

2. A method as set forth in claim 1 including
    forming said tab by shearing and bending a portion of said first ring member into a die opening.

3. A method as set forth in claim 2 including
    clamping said ring member to a die plate during said and shearing and bending.

4. A method as set forth in claim 1 including
    removing a portion of the radially outer tongue for each ring member, at the outer edge surface immediately adjacent to the distal end thereof.

5. A method for fabricating a piston ring assembly including the steps
    forming first and second split compression ring members with parallel side surfaces and generally cylindrical peripheral edge surfaces dimensioned for side-by-side mating relation;
    forming circumferentially overlapping contiguous tongues in the ends of each ring member, with radially confronting sealing surfaces;
    forming an index tab integral with said first ring member by partially displacing a shear plug from the ring material, intermediate its ends and intermediate its edges, to produce a boss projecting laterally from one side thereof and having a sharp intersection with said side surface; and displacing said shear plug into a die opening;
    forming a recess in one side of said second ring member, intermediate its ends and intermediate its edges, dimensioned to receive said boss with lateral clearance, to permit limited relative sliding movement of said first and second ring members in side-by-side relation;
    positioning said boss and said recess, on said respective first and second ring members, to maintain the joints of the mated ring members in rotationally spaced relation to each other;
    and finishing the confronting sides of said ring members to be fully contiguous in assembled mated relation.

6. A method as set forth in claim 5 including
    restraining the displacement of said shear plug to effect binding of said plug within said ring member.

7. A method as set forth in claim 5 including
    clamping said ring member to a die plate during the displacing of said shear plug.

* * * * *